United States Patent [19]  [11] 4,219,580
Torres  [45] Aug. 26, 1980

[54] FLOUR SUBSTITUTES

[75] Inventor: Anibal Torres, Waterford, Conn.

[73] Assignee: Pfizer Inc., New York, N.Y.

[21] Appl. No.: 920,453

[22] Filed: Jun. 29, 1978

Related U.S. Application Data

[63] Continuation of Ser. No. 766,218, Feb. 7, 1977, abandoned.

[51] Int. Cl.² .......................... A21D 2/18; A21D 2/32
[52] U.S. Cl. ..................... 426/549; 426/551; 426/553; 426/21; 426/622; 426/653; 426/658
[58] Field of Search ......... 426/19, 21, 24, 25, 426/549, 551, 552, 553, 556, 622, 653, 658, 661, 804, 662

[56] References Cited

U.S. PATENT DOCUMENTS

| | | | |
|---|---|---|---|
| 3,023,104 | 2/1962 | Battista | 426/549 |
| 3,573,061 | 3/1971 | Glabe et al. | 426/622 |
| 3,574,634 | 4/1971 | Singer | 426/19 X |
| 3,676,150 | 7/1972 | Glicksman et al. | 426/622 X |
| 3,767,423 | 10/1973 | Trantir et al. | 426/549 X |
| 3,992,554 | 11/1976 | Blake et al. | 426/804 X |
| 3,998,976 | 12/1976 | Pernod | 426/804 X |
| 4,042,714 | 8/1977 | Torres | 426/549 X |
| 4,089,981 | 5/1978 | Richardson | 426/804 X |
| 4,109,018 | 8/1978 | Thompson | 426/549 X |

FOREIGN PATENT DOCUMENTS 1344473 10/1963 France ................................. 426/622

OTHER PUBLICATIONS

"*Avicel RC-591, Microcrystalline Cellulose in Foods*", Bulletin RC-22, FMC Corporation, Avicel Dept., Marcus Hook, Pa., May 1971, pp. 23, 25, 27-29, 32, 33.
Avicel Application Bulletin, Bulletin No. RC-29, FMC Corp., pp. 1, 5-7.

*Primary Examiner*—Esther M. Kepplinger
*Attorney, Agent, or Firm*—Connolly and Hutz

[57] ABSTRACT

Flour substitutes such as purified plant cellulose and modified starches can be improved by adding thereto from about 1 to about 3.5 percent by weight of xanthan gum, and from about 2 to about 7 percent by weight of an emulsifier, such as lecithin.

10 Claims, No Drawings

FLOUR SUBSTITUTES

CROSS-REFERENCE TO RELATED APPLICATION

This application is a continuation of application Ser. No. 766,218 filed Feb. 7, 1977 now abandoned.

BACKGROUND OF THE INVENTION

This invention relates to reduced calorie food compositions, and more particularly to compositions which can be used in place of flour as the farinaceous component in leavened and non-leavened baked goods.

There is increasing interest in foodstuffs having a reduced caloric content, and especially in low-calorie baked goods. Such baked goods are desirable for reducing body weight in persons who are clinically obese, without using appetite suppressants, and also for preventing unwanted weight gain in normal persons. One approach to reducing the caloric value of baked goods has been to replace part of the flour or other carbohydrate components (e.g. sugar or starch) with agents which are substantially non-digestible, and hence non-caloric. For example, various forms of purified plant cellulose, such as the crystalline alpha-cellulose sold under the Tradename "Solka-Floc," and the microcrystalline cellulose sold under the Tradename "Avicel," have been proposed as partial flour substitutes. See further U.S. Pat. Nos. 2,978,446, 3,023,104 and 3,141,875. However, the cellulosic flour substitutes currently available suffer from the major disadvantage that they can only be used up to a replacement level of about 20%, which leads to a caloric reduction in the final baked goods of only about 10%. When the currently available cellulosic flour substitutes are used at replacement levels greater than about 20%, the baked goods obtained are of unsatisfactory quality from the standpoint of taste and texture. They produce goods which leave a residual, gritty, fibrous feeling in the mouth, which is not obviated by reducing the particle size of the cellulosic material. It is generally agreed, however, that calorie reduction of as high as 25% to 30% in baked goods in extremely desirable, and heretofore it has not been possible to achieve these calorie reduction levels by the use of cellulosic flour replacement alone. It has been necessary also to replace or remove other natural, common ingredients of farinaceous baked goods. See, for example, U.S. Pat. No. 3,979,523.

In like manner, the non-digestible modified starches which have been proposed as non-caloric flour substitutes suffer from the major disadvantage that they produce unsatisfactory baked goods when used at high replacement levels. For example, Belgian Pat. No. 844,345 discloses certain modified starches which can be improved by the addition of a small proportion of an emulsifier such as lecithin. However, even the latter flour substitutes produce unsatisfactory baked goods at replacement levels above about 20 to 25 percent. At replacement levels above about 20 to 25%, they produce baked goods of unacceptably low volume and unsatisfactory texture.

Accordingly, it is an object of this invention to provide improved flour substitutes, which produce highly satisfactory baked goods at use levels which can be as high as 70% replacement of the flour component. Baked goods produced using 70% replacement of the flour by an equal weight of a flour substitute of this invention have about 30% to 35% fewer calories per unit weight than conventional baked goods.

SUMMARY OF THE INVENTION

It is an object of this invention to provide novel compositions which are of value as substitutes for the flour component in leavened and unleavened baked goods, which can be used at a replacement level of up to about 70% and which produce baked goods with reduced caloric values of up to about 35%. Said novel compositions comprise either cellulose or a non-digestible, acid-treated starch derivative, or a mixture thereof, together with a minor amount of xanthan gum and a minor amount of an emulsifying agent (emulsifier). In practice, the xanthan gum is usually used in an amount in the range of about 1 to about 3.5 percent by weight, and the emulsifier is usually used in an amount in the range from about 2 to about 7 percent by weight, each based on the cellulose or acid treated starch derivative, or mixture thereof. The preferred amount of xanthan gum is from about 1 to about 2 percent, and the preferred amount of emulsifier is from about 3 to about 5 percent. Typical emulsifiers which are used are lecithin, mono-diglyceride mixture, sodium steroyl-2-lactylate and triglycerol monostearate. A particularly effective emulsifier is lecithin.

It is a further object of this invention to provide a method of extending flour, which comprises adding thereto an amount of one of the aforesaid novel flour substitutes, such that up to 70 percent by weight of the flour has been replaced by the said substitute.

It is a still further object of this invention to provide leavened and unleavened farinaceous baked goods, prepared using one of the aforesaid novel flour substitutes. In preparing such baked goods, the ratio by weight of the flour or other digestible starch component to the weight of the novel flour substitute is in the range from about 9:1 to about 3:7.

DETAILED DESCRIPTION OF THE INVENTION

Broadly, this invention relates to new, edible compositions, comprising cellulose or a non-digestible, acid-treated starch derivative, xanthan gum and one or more emulsifiers, said new compositions being of value as partial replacements for natural flour, in leavened and non-leavened baked goods.

A wide variety of cellulosic components can be used in preparing the compositions of this invention, since all cellulose is essentially nondigestible. It is essentially non-metabolized by the body, and it is therefore essentially non-nutritive and non-caloric. The cellulosic component can be so-called native, or regenerated, cellulose. However, a preferred form of cellulose for use in the compositions of this invention is the purified, crystalline, alpha cellulose obtained from plant fiber and sold under the Tradename "Solka-Floc."

A further preferred form of cellulose, useful for the composition of this invention, is the microcrystalline cellulose which is obtained by mild or drastic acidic hydrolysis of plant cellulose. Such cellulose has chains of relatively constant average molecular weight and is commonly referred to as "level off D.P." cellulose. Level off D.P. cellulose is described in detail by Battista in "Hydrolysis and Crystallization of Cellulose," *Industrial and Chemical Engineering*, 42, 507 (1950) and U.S. Pat. No. 3,023,104; and by Battista and Smith in the U.S. Pat. Nos. 2,978,446 and 3,141,446.

In like manner, the modified starch component of the compositions of the present invention can be any modified starch which is non-digestible. However, the preferred modified starch component is one which is prepared by heating natural starch, or a starch hydrolysate, with an edible di- or tri-basic carboxylic acid (or an anhydride thereof), and throughout this specification a modified starch prepared in this manner is referred to as a non-digestible, acid-treated starch derivative. The heating is carried out at a temperature in the range from 140° to 220° C. under reduced pressure for a period sufficient to form a non-digestible product, as determined by its resistance to the action of amylolytic enzymes, the mixture having prior to and during such heating a moisture content of less than 5% by weight of water and containing from 1 to 25% by weight of the edible acid (or an equivalent amount of anhydride) based on the total weight of the mixture before heating at the said temperature. When a starch hydrolysate is used, it can be a product of partial acidic or enzymatic hydrolysis of starch, which includes products variously known as thin boiling starches, corn syrup solids, white dextrins and amylase dextrins. Such products have dextrose equivalents varying from about 1 to about 70 and always contain a proportion of oligosaccharides, as well as monomeric glucose and the disaccharide maltose. One particularly advantageous form of starch hydrolysate that may be used is that produced by partial hydrolysis in the presence of the same acid as is to be incorporated in the mixture. Starches and starch hydrolysates which have been chemically modified to introduce a minor proportion of etherified or esterified hydroxyl groups, e.g. by reaction with alkylene oxides to form ethers or with organic or inorganic acids to form esters, or which have been oxidized to minor extent, may be used as starting materials, as can physically modified starches such as pregelatinized starch.

Edible di- and tri-basic carboxylic acids which can be used to prepare the non-digestible, acid-treated starch derivatives useful in this invention include maleic, fumaric, succinic, adipic, malic, tartaric, citric and isocitric acids. The preferred acid is citric acid, and the non-digestible, acid-treated starch derivative obtained using citric acid is conveniently termed "citrated starch." Examples of such citrated starches are shown in Preparations A to D, and are further described in Belgian Pat. No. 884,345. Anhydrides which can conveniently be used include maleic, succinic and citric anhydrides. As indicated hereinbefore, the edible acid forms from 1 to about 25% by weight of the mixture of starch or starch hydrolysate and edible acid before heating. The amount of edible acid has an important influence on the physical properties of the end product, in particular on the proportion of water-soluble material in the product and on the ability of the insoluble material to take up water. The use of smaller amounts of edible acid increases the proportion of soluble material and the up-take of water by the insoluble material, while the use of larger amounts of edible acid reduces the proportion of soluble material to very low levels, and also reduces the water up-take of the insoluble material. Preferably the amount of edible acid used is in the range from 5 to 15% by weight of the mixture before heating.

When preparing the non-digestible, acid-treated starch derivative for use in this invention by heating natural starch with an edible di- or tri-basic carboxylic acid, it is important that the moisture content of the mixture should be low not only prior to but also during heating. The mixture must contain less than 5% water at all times, and preferably less than 2%, by weight of the mixture. The mixture of edible acid and starch or starch hydrolysate may therefore have to be dried, e.g. by heating at a temperature below 120° C., preferably in the range from 60° to 120° C., to reduce its water content to below 5% by weight, before heating in the range 140° to 220° C., is begun. Water is formed by reaction between the carboxyl groups of the edible acid and the hydroxyl groups of the starch or starch hydrolysate, and also by condensation reactions between glucose moieties, and this must be removed continuously from the mixture during heating, by carrying out the heating step under reduced pressure, e.g. at below 100 mm. of mercury, preferably below 50 mm. of mercury. The pressure may be maintained at the required level by means of a vacuum pump or steam ejector. Operating under reduced pressure also has the advantage of reducing oxidation due to the presence of air, which leads to discoloration of the product. A purge of nitrogen, carbon dioxide or other inert gas can be introduced to remove air and to increase the efficiency of water removal during the heating step.

The temperature of heating required in the preparation of the non-digestible, acid-treated starch derivatives useful in this invention is in the range from 140° C. to about 220° C. The temperature actually used will depend on the physical nature of the mixture in this temperature range. When the mixture is in the liquid state, e.g., when mixtures containing starch hydrolysates are used, temperatures in the lower part of the range; e.g., 140° C. to 180° C. can be used. When the mixture is in the solid state, higher temperatures, e.g. 165° C. to 220° C., can be used. A temperature of about 180° C. is generally preferred, however. The period for which heating is continued will depend on the nature of the starting materials, the proportion of edible acid, the type of apparatus used for the heating step, and the properties required in the product, as well as on the actual temperature of heating. Thermally more efficient reactions can be carried out in the liquid phase than in the solid phase. Shorter periods can therefore be used when the mixture is in the liquid state, using for example a wiped film evaporator for the heating step, in which residence times of only a few minutes will be required to give a non-digestible product. Longers periods will, however, have to be used when the mixture is in the solid state and periods of up to 24 hours may then be necessary. The period necessary to give a non-digestible product also depends on the proportion of edible acid present. The lower the proportion of acid, the longer will be the necessary period. The actual period used will depend on the degree of water-solubility or water up-take required in the product. In general the longer the period of heating, the lower will be the proportion of water-soluble material in the product and the water up-take of the insoluble material. Moreover, when a starch hydrolysate is used, shorter periods of heating are required to give a non-digestible product than when starch itself is used, but longer periods of heating will be required to reduce the degree of solubility or water up-take of the product, compared with that required for starch itself. In general, the higher the dextrose equivalent of the starch hydrolysate, the shorter is the period required to give a non-digestible product and the longer will be the period required to reduce the degree of solubility or water up-take of the product to a desired level.

The temperature used will, of course, directly affect the period necessary to give a non-digestible product, and the period required to reduce the degree of solubility or water up-take of the product to the desired level.

Obviously the higher the temperature used, the shorter the period will be. Heating for excessive periods at the higher temperatures of the range may, however, result in products having undesirable color formation and cause some degradation and should, therefore, be avoided. It is preferred to keep the reaction period and temperature to the minimum required to form the desired product and this can be readily determined by experiment. Samples of the product are taken at regular intervals to determine the effect thereon of amylolytic enzymes, and when the product is resistant to the action of such enzymes then a non-digestible product has been formed. A product is taken to be resistant to the action of amylolytic enzymes when not more than 15%, and preferably not more than 5%, of the product is hydrolyzed by the enzyme under standard conditions, as measured by its dextrose equivalent relative to that of starch. Similarly, the proportion of soluble and insoluble material in the product can be determined by suspending the samples in water under standard conditions and filtering off the insoluble material. The water up-take of the insoluble material can then also be determined by standard methods.

The mixture of starch or starch hydrolysate and edible di- or tri-carboxylic acid can be prepared in a number of ways, before heating at 140° C. to 220° C. Solid materials, e.g., starch or starch hydrolysates of low dextrose equivalent and the edible acid in powder form, can be mixed by conventional solid/solid mixing techniques and then dried to a water content of less than 5% by weight. Alternatively, an aqueous solution of the edible acid may be sprayed onto starch or starch hydrolysate powder in a suitably agitated drier. Preferably, however, starch or starch hydrolysate powder is dispersed in an aqueous solution of the edible acid and the slurry is then dried by conventional techniques, e.g. by spray drying, drying on trays in an oven or drying on a heated roller. Starch hydrolysates having higher dextrose equivalents are liquid or syrupy materials containing some water. These can be mixed with an aqueous solution of the edible acid, and the mixture dried in conventional apparatus for evaporating aqueous liquids, e.g. a wiped-film or climbing-film evaporator.

As previously mentioned, a particularly advantageous method of achieving a mixture of a starch hydrolysate and edible acid is to carry out the hydrolysis of the starch in the presence of the edible acid itself. The proportion of edible acid in the mixture can be increased, if desired, by adding further acid after hydrolysis has been carried out to the desired degree of hydrolysis (as determined by the dextrose equivalent of the hydrolysate) and the mixture can then be dried by the methods already described for liquid mixtures and slurries. Alternatively, sufficient edible acid to perform the initial starch hydrolysis and the subsequent process of the invention can be added in the first instance and the time required to achieve a particular degree of hydrolysis thereby shortened.

After drying to a moisture content of less than 5%, the mixture (if it is a solid) is preferably milled to a small particle size, e.g. less than 150 micron average particle diameter, before the heating step. Alternatively, if the mixture containing less than 5% moisture is in the liquid phase (e.g. molten), it can be used directly for the heating step, in the same apparatus in which the drying step was carried out.

In this specification, the term xanthan gum refers to any hydrophilic colloid obtained by fermentation of a bacterium of the genus Xanthomonas, such as *X. campestris*, *X. incanae*, *X. carotae*, *X. begoniae*, *X. phaseoli* or *X. malvacearum*. However, the preferred xanthan gum is the colloid obtained by fermentation of *X. campestri* using glucose as the substrate. It is a heteropolysaccharide made up of building blocks of D-glucose, D-mannose and potassium D-glucuronate. The potassium can be replaced by several other alkali and alkaline earth metal cations. Preparation of a typical xanthan gum is taught by Edlin in U.S. Pat. No. 3,694,236.

In preparing the improved flour substitutes of this invention, it is possible to use any food-grade emulsifier, or mixtures thereof. However, classes of emulsifiers which lead to particularly effective products are lecithin, glycerol derivatives, lactylated fatty acids and sorbitan derivatives.

Lecithin is a natural product which is obtained from such sources as egg yolks and soybean. The natural lecithin obtained from soybean usually has the following approximate composition: chemical lecithin (phosphatidyl choline), 20%; cephalin (phosphatidyl ethanolamine), 20%; inositol phosphatides 21.5%; soybean oil, 34%; and miscellaneous components (e.g. sugars, sterols, water), 4.5%. It can be used in its unrefined form or with more or less soybean oil.

A wide variety of glycerol derivatives can be used as the emulsifier component. These include: (1) the pure monoesters of glycerol with fatty acids such as palmitic, stearic or oleic acid (both the 1-esters and the 2-esters); (2) the mono-esters of (1) which have been partially acetylated on the free hydroxy groups; (3) the mono-esters of (1) which have been partially or fully polyoxyethylated with ethylene oxide; (4) the so-called monodiglyceride mixture obtained by partial hydrolysis of animal and vegetable fats; (5) mono-diglyceride mixture which has been partially acetylated; (6) monodiglyceride mixture which has been partially or fully polyoxyethylated; (7) polyoxyethylated glycerol; and (8) monoesters of a polyglycerol (e.g. triglycerol) with a fatty acid such as stearic acid.

In regard to the lactylated fatty acids which can be used in the compositions of this invention, these include the products made by acylation of lactic acid, or dehydrated lactic acid, with the acyl chloride of a fatty acid.

Sorbitan derivatives which are of particular value as emulsifiers in this invention are mono-esters of sorbitan (sorbitol anhydride) with fatty acids, and also mono-esters of sorbitan with a fatty acid which have been polyoxyethylated on the remaining free hydroxy groups.

The preferred emulsifiers for use in this invention are lecithin, mono-diglyceride mixture, sodium steroyl-2-lactylate and triglycerol monostearate.

In preparing the novel flour substitutes of this invention, the components can be combined in any conventional manner, using any method which will effectively admix the components. However, it is a preferred method of preparing the flour substitutes to first heat the emulsifier to a temperature of about 60° C., then thoroughly admix this with the xanthan gum. The cellulose or non-digestible, acid-treated starch derivative, or mixture thereof, is then added and the resultant mixture is blended until a homogeneous, free-flowing powder is obtained.

In like manner, in preparing the batter or dough for the reduced calorie baked goods of this invention, the total ingredients can be combined in any order and by any method which will give the batter or dough the desired consistency. However, it is a preferred method to pre-combine the emulsifier, xanthan gum and cellulose or acid-treated starch derivative, or mixture thereof, before admixing with other ingredients.

A wide variety of baked goods can be prepared using the compositions of this invention. Indeed, the novel compositions of this invention can be used to replace up to 70% of the flour in any baked goods in which flour is commonly used. Typical examples of baked goods which can be prepared are bread, cakes, cookies, crackers, biscuits, pizza crusts, Danish pastries, Swedish pastries, cinnamon rolls, corn chips, and the like. The preferred use of the compositions of this invention is in bread, cakes, cookies, pastries and doughnuts.

As will be appreciated by one skilled in the art, eggs are commonly used as ingredients in a variety of baked goods, such as cakes, cookies, doughnuts, etc. However, the 2 to 7 percent of emulsifier which is added to prepare the novel flour substitutes and baked goods of this invention is in addition to any lecithin which might be added in the form of egg yolk.

One particularly advantageous use of the novel flour substitutes of this invention is in the preparation of baked goods in which some or all of the sugar component has been replaced by a non-caloric sugar substitute, such as the modified polydextroses described in U.S. Pat. No. 3,766,165.

The following examples are provided solely for the sake of further exemplification.

EXAMPLE I

Flour Substitutes

Citrated starch, Avicel PH-101 and Solka-Floc B-200 were each co-formulated with lecithin and food grade xanthan gum, according to the following proportions and procedures to obtain flour substitutes, I, II and III.

| Flour Substitute No: Ingredients | I % by weight | II % by weight | III % by weight |
| --- | --- | --- | --- |
| Citrated starch | 95.4 | — | — |
| Avicel | — | 95.4 | — |
| Solka-Floc | — | — | 95.4 |
| Lecithin | 3.5 | 3.5 | 3.5 |
| Xanthan Gum | 1.1 | 1.1 | 1.1 |
| Total | 100.0 | 100.0 | 100.0 |

The lecithin in each case was heated to 60° C. and thoroughly mixed with the xanthan gum. Subsequently the citrated starch in Formula I, or Avicel or Solka-Floc in Formulas II and III, was added and blended to obtain a free flowing powder of homogeneous appearance.

The citrated starch was prepared according to the procedure of Preparation A; Avicel PH-101 is a commercial, food grade, microcrystalline, partially depolymerized cellulose, obtained by treating plant cellulose with mineral acid as described in U.S. Pat. No. 2,978,446; and Solka-Floc B-200 is a commercial, food grade, crystalline alpha cellulose having the following characteristics:

| | |
| --- | --- |
| Average fiber length ($\mu$) | 30–35 |
| Screen analysis (Ro-Tap, Tyler | |
| % on 35 mesh | 0–0.5 |
| % through 100 mesh | 95–99 |
| % through 200 mesh | 80–80 |

The resultant powders were found to have a mild corn meal-like flavor and were insoluble in water. However they absorbed water and behaved in a manner analogous to wheat flour when incorporated in the preparation of sweetened leavened baked goods. In addition they allowed the reduction of shortening from 25–50% depending on the type of baked product and thus provided a product with significantly reduced calories. These effects are best demonstrated in Example II.

EXAMPLE II

Cakes

A typical cake (referred to hereinafter as "Cake No 1") was prepared, using the following ingredients and procedure:

| Ingredient | Amount (grams) |
| --- | --- |
| Emulsified shortening | 31.73 |
| Sugar (sucrose) | 56.10 |
| Non-fat milk solids | 3.30 |
| Whole eggs (beaten) | 23.10 |
| Water | 30.04 |
| Cake flour | 56.20 |
| Sodium bicarbonate | 1.05 |
| Glucono delta lactone | 2.20 |
| Vanilla extract | 0.28 |
| | 204.00 |

Procedure: In a 400 ml. stainless steel beaker, the non-fat milk solids, sugar and shortening were creamed for 3 minutes. The eggs were added and the mixture was beaten for 2 minutes. The water and the vanilla extract were combined and added to the above, and then the resulting mixture was mixed for 2–3 minutes until a homogeneous creamy liquid was obtained. Meanwhile, the cake flour, sodium bicarbonate and glucono delta lactone were premixed and added to the other hydrated ingredients. The resulting mixture was mixed 3–5 minutes until a dough of smooth consistency was obtained. A portion of this dough (120 g.) was placed into a lightly-greased, tared, 250 ml. rectangular pan, and then baked at 162° C. for 32 minutes.

Three further cakes (Cakes Nos. 2, 3 and 4, respectively) were prepared, in which 50 percent of the cake flour was replaced by an equal weight of flour substitutes I, II and III, respectively, of Example I. Thus, the ingredients used were as follows:

| Cake No: Ingredients | 2 Grams | 3 Grams | 4 Grams |
| --- | --- | --- | --- |
| Emulsified shortening | 16.04 | 16.04 | 16.04 |
| Sugar (Sucrose) | 56.10 | 56.10 | 56.10 |
| Non-fat Milk Solids | 3.30 | 3.30 | 3.30 |
| Whole Eggs (Beaten) | 23.10 | 23.10 | 23.10 |
| Water | 45.73 | 45.73 | 45.73 |
| Cake Flour | 28.10 | 28.10 | 28.10 |
| Flour substitute I | 28.10 | — | — |
| Flour substitute II | — | 28.10 | — |
| Flour substitute III | — | — | 28.10 |
| Sodium Bicarbonate | 1.05 | 1.05 | 1.05 |
| Glucono Delta Lactone | 2.20 | 2.20 | 2.20 |

| Cake No: | 2 | 3 | 4 |
|---|---|---|---|
| Ingredients | Grams | Grams | Grams |
| Vanilla Extract | 0.28 | 0.28 | 0.28 |
| | 204.00 | 204.00 | 204.00 |

The procedure for making Cakes 2, 3 and 4 was the same as Cake 1, except that the flour substitute was added to the hydrated ingredients, and creamed for 3 minutes, before the premixed flour, sodium bicarbonate and glucono delta lactone were added.

The following data on Cakes 1, 2, 3 and 4 were determined:

| OBSERVATION | CAKE NO. | | | |
|---|---|---|---|---|
| | 1 | 2 | 3 | 4 |
| pH of dough before baking (25% slurry) | 6.50 | 6.60 | 7.05 | 6.85 |
| pH of baked dough (25% slurry) | 6.10 | 6.30 | 6.70 | 6.40 |
| Weight loss of baked dough in percent | 10.20 | 9.30 | 10.40 | 9.80 |
| Cake displacement volume in cubic centimeters | 320 | 330 | 315 | 318 |
| Cake Color (Interior) | Normal creamy white | Tannish or light yellow | Normal creamy white | Normal creamy white |
| Cake Color (Exterior) | Normal-golden yellow crust | Normal-golden yellow crust | Light yellow crust | Light yellow crust |
| Texture of Cake | Very good grain, smooth even texture | Similar to that of 1 but slightly moister | Good grain and smooth texture, slightly drier | Very similar to 3 |
| Cake Symmetry | Convex surface with smooth and uniform crust | Similar to 1 | Comparable to 1 | Comparable to 3 |
| Caloric value per gram | 4.11 | 2.82 | 2.84 | 2.83 |

EXAMPLE III

Flour Substitutes

Citrated starch, Avicel PH-101 and Solka-Floc B-200 were each coformulated with mono-diglyceride mixture (an emulsifier) and xanthan gum, according to the following proportions and procedure, to obtain flour substitutes IV, V and VI.

| Flour Substitute No.: | IV | V | VI |
|---|---|---|---|
| Ingredients: | % by weight | % by weight | % by weight |
| Citrated Starch | 92.5 | — | — |
| Avicel PH-101 | — | 92.5 | — |
| Solka-Floc B-200 | — | — | 92.5 |
| Xanthan Gum | 2.5 | 2.5 | 2.5 |
| Mono-diglyceride mixture | 5.0 | 5.0 | 5.0 |
| Total | 100.0 | 100.0 | 100.0 |

Procedure: The procedure of Example I was used.

The citrated starch used in this example was prepared according to the procedure of Preparation A.

EXAMPLE IV

Chocolate Cakes

Four chocolate cakes (Cakes 5, 6, 7 and 8, respectively) were baked using the following ingredients and method:

| Cake No. | 5 | 6 | 7 | 8 |
|---|---|---|---|---|
| Ingredients: | Grams | Grams | Grams | Grams |
| Emulsified Shortening | 67.29 | 48.12 | 48.12 | 48.12 |
| Cake Flour | 113.40 | 56.70 | 56.70 | 56.70 |
| Flour Substitute IV | — | 56.70 | — | — |
| Flour Substitute V | — | — | 56.70 | — |
| Flour Substitute VI | — | — | — | 56.70 |
| Nonfat Milk Solids | 13.50 | 13.50 | 13.50 | 13.50 |
| Water | 129.98 | 146.87 | 146.87 | 146.87 |
| Whole Eggs (Beaten) | 68.73 | 68.73 | 68.73 | 68.73 |
| Egg Whites (Fresh) | 22.50 | 22.50 | 22.50 | 22.50 |
| Sodium Bicarbonate | 2.10 | 6.90 | 6.90 | 6.90 |
| Vanilla Extract | 3.90 | 3.90 | 3.90 | 3.90 |
| Sugar (Sucrose) | 158.40 | 158.40 | 158.40 | 158.40 |
| Glucono Delta Lactone | — | 1.98 | 1.98 | 1.98 |
| Double Acting Baking Powder | 4.50 | — | — | — |
| Cocoa Powder 10-12% Fat | 23.70 | 23.70 | 23.70 | 23.70 |
| | 608.00 | 608.00 | 608.00 | 608.00 |

Method: The non-fat milk solids, sugar and shortening were creamed for 3 minutes. The whole eggs and egg whites were added and the mixture was beaten for 2 minutes. The water and vanilla were added, and the mixture was creamed until a homogeneous creamy liquid was obtained. In the case of Cakes 6, 7 and 8, the flour substitute was added at this stage and the mixture was blended until homogeneous. Meanwhile the flour, leavening agents and cocoa were premixed, and then added to the above. The total mixture was mixed for 2-3 minutes, and then 460 g. of the dough thus obtained was poured into an 8"×1½", greased, tared, round cake pan. The cake was baked at 180° C. for 30 minutes.

The following data on Cakes 5, 6, 7 and 8 were obtained:

| Cake No.: | 5 | 6 | 7 | 8 |
|---|---|---|---|---|
| pH (25% slurry) | 8.80 | 8.65 | 9.30 | 9.40 |
| Symmetry | even across pan liner | even across pan liner | even across pan liner | even across pan liner |
| Texture | Very good grain smooth even texture | Similar to 5 but with a slight moist texture | Good grain and smooth texture, slightly drier than 5, 7 & 8 | Comparable to 5 in grain, texture and moistness |
| Cake Dough Weight Loss (%) | 9.57 | 8.86 | 9.08 | 9.08 |
| Crust and color | Even-uniform | Even-uniform | Even-uniform | Even-uniform |
| Cake Weight Grams | 416.0 | 419.0 | 417.2 | 418.2 |
| Taste | Very good moist chocolate cake | Similar in quality and mouthfeel to 5 & 7 | Slightly drier in mouthfeel than 5 but of good quality | Similar to 7 in taste quality |

EXAMPLE V

The three low-calorie flour replacements containing citrated starch, Avicel PH-101 and Solka-Floc B-200 described in Example III were reproduced utilizing the emulsifiers sodium stearoyl-2-lactylate and triglycerol monostearate in place of the mono-diglyceride mixture. When bake tested in the chocolate cake recipe outlined in Example IV, the resultant cake exhibited color, volume, textural and organoleptic qualities similar to Cake 5.

EXAMPLE VI

Flour Substitutes

Citrated starch, Avicel PH-101 and Solka-Floc B-200 were co-formulated with xanthan gum and the emulsifiers lecithin, sodium steroyl-2-lactylate, triglycerol monostearate or mono-diglyceride mixture, according to the procedure of Example I, and using the following proportions of ingredients. This afforded flour substitutes Nos. VII to XVIII. The citrated starch used in this Example was the product of Preparation A.

| Ingredients (in grams) | Flour Substitute No.: | | | | | | | | | | | |
|---|---|---|---|---|---|---|---|---|---|---|---|---|
|  | VII | VIII | IX | X | XI | XII | XIII | XIV | XV | XVI | XVII | XVIII |
| Citrated starch | 94.0 | — | — | 92.0 | — | — | — | — | 94.5 | 91.0 | — | — |
| Avicel PH-101 | — | 94.5 | — | — | 93.0 | — | — | 91.2 | — | — | — | 94.0 |
| Solka-Floc B-200 | — | — | 91.5 | — | — | 95.0 | 93.5 | — | — | — | 92.0 | — |
| Lecithin | 5.0 | — | — | 7.0 | — | — | — | — | 2.5 | — | — | — |
| Sodium Stearoyl-2-lactylate | — | — | — | — | — | 5.0 | — | — | 7.0 | — | 2.5 | — |
| Triglycerol monostearate | — | — | 5.0 | — | — | 2.5 | — | — | — | — | 7.0 | — |
| Mono Diglyceride Mixture | — | 2.5 | — | —5.0 | — | — | 7.0 | — | — | — | — | — |
| Xanthan gum | 1.0 | 3.0 | 3.5 | 1.0 | 2.0 | 2.5 | 1.5 | 1.8 | 3.0 | 2.0 | 1.0 | 3.5 |
| Totals: | 100.0 | 100.0 | 100.0 | 100.0 | 100.0 | 100.0 | 100.0 | 100.0 | 100.0 | 100.0 | 100.0 | 100.0 |
| Calories per 100 grams: | 44.0 | 22.0 | 44.0 | 62.0 | 44.0 | 22.0 | 44.0 | 62.0 | 22.0 | 62.0 | 62.0 | 22.0 |

EXAMPLE VII

Onion rolls (Formulation No. 1) were prepared using flour as the only starch component, and also using each of the Flour Substitutes VII to XVIII (Formulations 2 to 13, respectively), according to the following recipes and method.

| Ingredients (in grams) | Formulation No.: | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| Active dry yeast | 2.7 | 3.2 | 3.2 | 3.2 | 3.2 | 3.2 | 3.2 | 3.2 | 3.2 | 3.2 | 3.2 | 3.2 | 3.2 |
| Water 45° C. | 29.7 | 47.4 | 47.4 | 47.4 | 47.4 | 47.4 | 47.4 | 47.4 | 47.4 | 47.4 | 47.4 | 47.4 | 47.4 |
| Sugar (Sucrose) | 17.0 | 16.0 | 16.0 | 16.0 | 16.0 | 16.0 | 16.0 | 16.0 | 16.0 | 16.0 | 16.0 | 16.0 | 16.0 |
| Salt | 1.0 | 1.0 | 1.0 | 1.0 | 1.0 | 1.0 | 1.0 | 1.0 | 1.0 | 1.0 | 1.0 | 1.0 | 1.0 |
| Whole eggs (beaten) | 17.0 | 16.0 | 16.0 | 16.0 | 16.0 | 16.0 | 16.0 | 16.0 | 16.0 | 16.0 | 16.0 | 16.0 | 16.0 |
| Butter | 18.6 | 17.0 | 17.0 | 17.0 | 17.0 | 17.0 | 17.0 | 17.0 | 17.0 | 17.0 | 17.0 | 17.0 | 17.0 |
| All purpose flour | 86.0 | 52.0 | 52.0 | 52.0 | 52.0 | 52.0 | 52.0 | 52.0 | 52.0 | 52.0 | 52.0 | 52.0 | 52.0 |
| Gluten | — | 2.0 | 2.0 | 2.0 | 2.0 | 2.0 | 2.0 | 2.0 | 2.0 | 2.0 | 2.0 | 2.0 | 2.0 |
| Fungal Protease enzyme | — | 0.4 | 0.4 | 0.4 | 0.4 | 0.4 | 0.4 | 0.4 | 0.4 | 0.4 | 0.4 | 0.4 | 0.4 |
| Raw onions (chopped) | 1.0 | 1.0 | 1.0 | 1.0 | 1.0 | 1.0 | 1.0 | 1.0 | 1.0 | 1.0 | 1.0 | 1.0 | 1.0 |
| Flour Substitute VII | — | 28.0 | — | — | — | — | — | — | — | — | — | — | — |
| Flour Substitute VIII | — | — | 28.0 | — | — | — | — | — | — | — | — | — | — |
| Flour Substitute IX | — | — | — | 28.0 | — | — | — | — | — | — | — | — | — |
| Flour Substitute X | — | — | — | — | 28.0 | — | — | — | — | — | — | — | — |
| Flour Substitute XI | — | — | — | — | — | 28.0 | — | — | — | — | — | — | — |
| Flour Substitute XII | — | — | — | — | — | — | 28.0 | — | — | — | — | — | — |

| Ingredients (in grams) | Formulation No.: | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Flour Substitute XIII | — | — | — | — | — | — | — | 28.0 | — | — | — | — | — |
| Flour Substitute XIV | — | — | — | — | — | — | — | — | 28.0 | — | — | — | — |
| Flour Substitute XV | — | — | — | — | — | — | — | — | — | 28.0 | — | — | — |
| Flour Substitute XVI | — | — | — | — | — | — | — | — | — | — | 28.0 | — | — |
| Flour Substitute XVII | — | — | — | — | — | — | — | — | — | — | — | 28.0 | — |
| Flour Substitute XVIII | — | — | — | — | — | — | — | — | — | — | — | — | 28.0 |
| Totals: | 173.0 | 184.0 | 184.0 | 184.0 | 184.0 | 184.0 | 184.0 | 184.0 | 184.0 | 184.0 | 184.0 | 184.0 | 184.0 |

Method: The yeast and the protease were dissolved in the water. In the case of formulation 1, the sugar, salt, butter, eggs and flour were then added. In formulations 2 to 13, the appropriate flour substitute was premixed with the gluten and subsequently combined with the yeast and protease solution by mixing for 2-3 minutes before adding the sugar, salt, butter, eggs and flour. The resulting mixture was blended to form a dough, and then the dough was transferred to a 900 ml. beaker. The dough was allowed to rest at 75-90% relative humidity at 27°-32° C. for 1.5 hours. The dough was punched down, and then 36.5 g. of the dough was shaped into a wedge and rolled up beginning at the rounded edge. The remainder of the dough was similarly prepared into rolls and the rolls were placed on a greased baking sheet. The rolls were allowed to rest at 75-90% relative humidity at 27°-32° C., then they were baked in a preheated oven at 204° C. for 13 minutes.

The onion rolls prepared from Formulations Nos. 2-13 were found to be satisfactory from the standpoint of flavor, texture and color, when compared with the control onion rolls prepared from Formulation No. 1. However, the onion rolls prepared from Formulations 2-13 contained 28% fewer calories than the standard control.

EXAMPLE VIII

Flour Substitutes

Citrated starch and Solka-Floc were each co-formulated with xanthan gum and lecithin, according to the procedure of Example I, and using the following proportions of ingredients:

| Flour Substitute No.: | XIX | XX |
|---|---|---|
| Ingredients | Weight % | Weight % |
| Lecithin | 4.70 | 4.70 |
| Xanthan Gum (Food Grade) | 1.60 | 1.60 |
| Citrated Starch | 93.70 | — |
| Solka-Floc B-200 | — | 93.70 |
| Total: | 100.00 | 100.00 |

The citrated starch used in this example was prepared according to the procedure of Preparation A.

EXAMPLE IX

Doughnuts (Doughnuts 1) were prepared using flour as the only farinaceous component. Doughnuts were also prepared using Flour Substitutes XIX and XX (Doughnuts 2 and 3). The following ingredients and method were used.

| Doughnuts No.: | 1 | 2 | 3 |
|---|---|---|---|
| Ingredients | Weight % | Weight % | Weight % |
| All-purpose flour | 40.78 | 14.74 | 14.74 |
| Sugar (Sucrose) | 24.36 | 21.14 | 21.14 |
| Baking powder | 1.37 | 1.29 | 1.29 |
| Salt (NaCl) | 0.32 | 0.28 | 0.38 |
| Shortening | 2.44 | 1.29 | 1.29 |
| Whole eggs (beaten) | 11.23 | 9.74 | 9.74 |
| Non-fat milk solids | — | 3.13 | 3.13 |
| Cinnamon powder | 0.21 | 0.21 | 0.21 |
| Whole milk | 19.29 | — | — |
| Gluten | — | 0.88 | 0.88 |
| Water | — | 28.37 | 28.37 |
| Flour Substitute XIX | — | 18.93 | — |
| Flour Substitute XX | — | — | 18.93 |
| Total: | 100.00 | 100.00 | 100.00 |

Method: In the case of Doughnuts 1, half of the amount of flour was mixed with the rest of the ingredients until a creamy, homogeneous mixture was obtained. In the case of Doughnuts 2 and 3, the appropriate flour substitute was mixed with the rest of the ingredients (other than the flour) until a creamy, homogeneous mixture was obtained. At this point, in each case, the remainder of the flour was stirred in using a spoon. The resulting dough was lightly rolled out on a floured board and cut with a doughnut cutter. The doughnuts were fried in deep oil at 190° C. for 3 minutes.

Comparison of Doughnuts 2 and 3 with the control doughnuts (Doughnuts 1) showed that Doughnuts 2 and 3 were quite acceptable from the standpoint of texture, color and flavor. The control doughnuts were found to absorb 41% more oil than Doughnuts 2 and 3. On a weight basis, Doughnuts 2 and 3 contained approximately 70% of the caloric value of the control doughnuts.

EXAMPLE X

Chocolate Flavored Cookies

Chocolate flavored cookies were made by replacing 50% of the flour in a standard recipe with each of the flour substituents described in Example I, using the following proportions of ingredients and according to the directions given below.

| Ingredients | Grams |
|---|---|
| Emulsified Shortening | 29.80 |
| Modified polydextrose, bleached and neutralized 70% solution | 48.60 |
| Sodium cyclamate/sodium saccharin blend (9:1) | 0.34 |
| Sodium bicarbonate | 0.30 |
| Sodium chloride | 0.70 |
| Nonfat milk solids | 3.00 |
| Whole eggs (beaten) | 14.00 |
| Whole milk | 11.20 |
| Vanilla extract | 0.50 |
| All-purpose flour | 26.25 |
| Double acting baking powder | 1.50 |

| Ingredients | Grams |
|---|---|
| Cocoa powder 10-12% fat | 10.00 |
| Flour substitute (I, II or III) | 26.25 |
| water | 11.56 |
| Total | 184.00 |

Modified polydextrose is prepared according to Example I of U.S. Pat. No. 3,766,165.

Method: The shortening, non-fat milk solids, eggs, artificial sweetner, modified polydextrose solution, water and vanilla were mixed until a homogeneous mixture was obtained. The flour substitute was added and thoroughly mixed. The flour, salt, sodium bicarbonate, baking powder and cocoa powder were preblended and then added to the rest of hydrated ingredients and mixed until a homogeneous, creamy mixture was obtained. Small amounts of the cookie dough were placed onto a pregreased, tared cookie sheet, spacing them about 1½" apart. The cookies were then baked at 190° C. for 15 minutes.

The resultant cookies were found to have good color, flavor and texture and were rated very similar in all respects to standard cookies made with practical levels of flour and sugar. However the cookies prepared as described above contained 46% fewer calories than standard cookies.

EXAMPLE XI

Flour Substitutes

Solka Floc B-200 was formulated with xanthan gum and the emulsifiers lecithin and mono-diglyceride mixture, according to the procedure of Example I, and using the following proportions

| Flour substitute No.: | XXI | XXII | XXIII |
|---|---|---|---|
| Ingredients | Percent by weight | | |
| Solka Floc B-200 | 94.7 | 95.3 | 91.2 |
| Lecithin | 3.7 | 3.6 | — |
| Mono-diglyceride mixture | — | — | 6.5 |
| Xanthan gum | 1.6 | 1.1 | 2.3 |
| | 100.0 | 100.0 | 100.0 |

EXAMPLE XII

Chocolate Cakes

Three chocolate cakes (Cakes 9, 10 and 11) were prepared using the following ingredients

| Cake No: Ingredients (g) | 9 | 10 | 11 |
|---|---|---|---|
| Emulsified Shortening | 22.43 | 16.04 | 16.04 |
| Flour substitute No. XXI | | 19.9 | 19.9 |
| Sugar (Sucrose) | 5.28 | 26.4 | |
| Fructose | | | 26.4 |
| Modified polydextrose | | 26.4 | 26.4 |
| Non-fat milk solids | 4.5 | 4.5 | 4.5 |
| Whole eggs (beaten) | 22.91 | 22.91 | 22.91 |
| Egg whites | 7.5 | 7.5 | 7.5 |
| Cake flour | 37.8 | 18.9 | 18.9 |
| Water | 43.43 | 48.06 | 48.06 |
| Sodium bicarbonate | 0.7 | 2.3 | 2.3 |
| Glucono delta lactone | | 0.66 | 0.66 |
| Double acting baking powder | 1.5 | | |
| Vanilla extract | 1.3 | 1.3 | 1.3 |
| Cocoa powder (10-12% fat) | 7.9 | 7.9 | 7.9 |
| Total weight (g) | 202.77 | 202.77 | 202.77 |
| Total calories | 618.77 | 425.01 | 425.01 |
| Weight of batter used (g) | 120.00 | 120.00 | 120.00 |
| Cooked weight (g) | 104.5 | 108.7 | 109.3 |
| pH of batter (25% slurry) | 7.25 | 7.35 | 7.45 |
| pH of cake (25% slurry) | 8.6 | 9.3 | 8.5 |
| Volume of cake (ml) | 315 | 285 | 290 |

Cake No. 9 was prepared using a typical recipe and can be regarded as a standard chocolate cake.

In Cake No. 10, 50% of the flour was replaced by Flour Substitute No. XXI and 50% of the sugar is replaced by an equal weight of modified polydextrose. Examination of Cake No. 10 showed that it had good color characteristics, good texture characteristics (slightly more moist than Cake No. 9) and acceptable sweetness intensity (slightly less sweet than Cake No. 9). In comparing Cake No. 10 with Cake No. 9, there is a 34% reduction in caloric value, as calculated from the known caloric content of the ingredients.

In Cake No. 11, 50% of the flour was replaced by Flour Substitute No. XXI and the sugar is replaced by an equal weight of 1:1 modified polydextrose-fructose mixture. Examination of Cake No. 11 showed that it was very similar to Cake No. 10. In comparing Cake No. 11 with Cake No. 9, there is also a 34% reduction in caloric value, based on the known caloric content of the ingredients.

EXAMPLE XIII

Vanilla Cakes

Three vanilla cakes (Cakes 12, 13 and 14) were prepared using the following ingredients

| Cake No: Ingredients (g) | 12 | 13 | 14 |
|---|---|---|---|
| Emulsified Shortening | 31.73 | 16.04 | 16.04 |
| Flour substitute No. XXII | | 29.4 | 29.4 |
| Sugar (Sucrose) | 56.1 | 28.0 | |
| Fructose | | | 28.0 |
| Modified polydextrose | | 28.0 | 28.0 |
| Non-fat milk solids | 3.3 | 3.3 | 3.3 |
| Whole eggs (beaten) | 23.1 | 23.1 | 23.1 |
| Cake flour | 56.2 | 28.1 | 28.1 |
| Water | 30.13 | 45.0 | 45.0 |
| Sodium bicarbonate | 0.38 | 1.05 | 1.05 |
| Glucono delta lactone | 0.77 | 2.2 | 2.2 |
| Vanilla extract | 0.275 | 0.275 | 0.275 |
| Total weight (g) | 201.98 | 204.46 | 204.46 |
| Total calories | 752.08 | 441.4 | 441.4 |
| Weight of batter used | 120.0 | 120.0 | 120.0 |
| Cooked weight (g) | 110.5 | 109.6 | 110.5 |
| pH of batter (25% slurry) | 6.6 | 6.7 | 7.0 |
| pH of cake (25% slurry) | 6.2 | 6.2 | 5.9 |
| Volume of cake (ml) | 310 | 280 | 295 |

Cake No. 12 was prepared using a typical recipe and can be regarded as a standard.

In Cake No. 13, 50% of the flour was replaced by Flour Substitute No. XXII and 50% of the sugar is replaced by an equal weight of modified polydextrose. Examination of Cake No. 13 showed that it had good color characteristics, good texture characteristics (slightly more moist than Cake No. 12) and acceptable sweetness intensity (slightly less sweet than Cake No. 12). In comparing Cake No. 13 with Cake No. 12, there is a 42% reduction in caloric value, as calculated from the known caloric contents of the ingredients.

In Cake No. 14, 50% of the flour was replaced by Flour Substitute No. XXII and the sugar is replaced by an equal weight of 1:1 modified polydextrose fructose mixture. Evaluation of Cake No. 14 showed that it was very similar to Cake No. 13. In comparing Cake No. 14 to Cake No. 12, there is also a 42% reduction in caloric value, based on the known caloric content of the ingredients.

EXAMPLE XIV

Vanilla Cookies

Three sets of vanilla cookies (Cookies Nos. 2, 3 and 4) were prepared using the following ingredients.

| Cookies No: Ingredients (g) | 2 | 3 | 4 |
|---|---|---|---|
| Emulsified Shortening | 50.00 | 43.0 | 43.0 |
| Flour substitute No. XXIII | | 33.5 | 33.5 |
| Sugar (Sucrose) | 37.5 | 28.0 | |
| Fructose | | | 28.0 |
| Modified polydextrose | | 9.38 | 9.38 |
| Whole eggs (beaten) | 14.0 | 14.0 | 14.0 |
| Cake flour | 61.75 | 30.8 | 30.8 |
| Water | | 35.0 | 35.0 |
| Sodium bicarbonate | | 0.2 | 0.2 |
| Glucono delta lactone | | 0.3 | 0.3 |
| Double acting baking powder | 0.25 | | |
| Imitation vanilla flavoring | 0.6 | 0.6 | 0.6 |
| Salt | 0.4 | 0.2 | 0.2 |
| Total weight (g) | 164.50 | 194.97 | 194.97 |
| Total calories | 835.64 | 651.77 | 651.77 |
| Weight of batter used (g) | 6.70 | 6.90 | 8.41 |
| Cooked weight (g) | 6.00 | 5.58 | 7.01 |
| pH of batter (25% slurry) | 5.70 | 6.45 | 6.55 |
| pH of cookies (25% slurry) | 5.90 | 5.70 | 5.75 |

Cookies No. 2 represents vanilla cookies prepared according to a typical recipe.

In Cookies No. 3, 50% of the flour was replaced by an approximately equal weight of Flour Substitute XXIII, and 25% of the sugar is replaced by modified polydextrose. Evaluation of Cookies No. 3 showed that they were a little lighter in color than the Cookies No. 2; had a slightly coarser grain but were more moist than 2; and were slightly less sweet than 2. The sweetness intensity of Cookies No. 3 was acceptable however.

Cookies No. 4 were prepared in the same manner as Cookies No. 3, except that the sugar was replaced by fructose. Cookies 3 and 4 were very similar from the standpoint of color, texture and sweetness intensity.

EXAMPLE XV

Flour Substitutes

Flour substitutes XXIV, XXV and XXVI, were prepared by co-formulating citrated starch, xanthan gum and lecithin in the ratio of 28.0:0.3:1.0 by weight, according to the procedure of Example I. In flour substitute XXIV, the citrated starch was the product of Preparation B; in flour substitute XXV, the citrated starch was the product of Preparation C; and in flour substitute XXVI, the citrated starch was the product of Preparation D.

EXAMPLE XVI

Vanilla Cakes

Vanilla cakes 15, 16 and 17 were prepared using the following ingredients:

| Cake No: Ingredients | 15 Grams | 16 Grams | 17 Grams |
|---|---|---|---|
| Emulsified Shortening | 16.04 | 16.04 | 16.04 |
| Cake flour | 28.1 | 28.1 | 28.1 |
| Instant non-fat milk | 3.3 | 3.3 | 3.3 |
| Water | 45.0 | 45.0 | 45.0 |
| Eggs | 23.1 | 23.1 | 23.1 |
| Sodium bicarbonate | 1.05 | 1.05 | 1.05 |
| Vanilla extract | 0.28 | 1.0 | 0.28 |
| Sugar | 56.1 | 56.1 | 56.1 |
| Glucono delta lactone | 2.2 | 2.2 | 2.2 |
| Flour Substitute XXIV | 29.3 | — | — |
| Flour Substitute XXV | — | 29.3 | — |
| Flour Substitute XXVI | — | — | 29.3 |

Method: The cakes were prepared by the procedure described for Cakes 2, 3 and 4 in Example II.

PREPARATION A

Citrated Starch

Raw maize starch powder, of average particle diameter about 25 microns, containing about 10% moisture, is dried in an oven at 60° C. to reduce its water content to 1% by weight. The dried powder (170 g.) is then blended with anhydrous citric acid, powder of average particle diameter about 150 microns (30 g.), in a conventional blending apparatus to give a homogeneous mixture. The mixture is then heated in a glass flask at 180° C. on an oil bath at a pressure of 50 mm. mercury (maintained by a vacuum pump) for 3 hours. Samples taken at intervals during the heating period have shown that proportion of the product hydrolysable by α-amylase is progressively reduced until at the end of the period it is only 4%. The proportion of water-soluble material is also progressively reduced to 10%.

After cooling to room temperature, the product (180 g.) is suspended twice in water (820 ml.) and filtered, re-suspended in water (820 ml.), bleached by adding 72 ml. of a 10% aqueous solution of sodium chlorite, neutralized to pH 6 by addition of 10% aqueous sodium carbonate, filtered, washed with water and dried to give 160 g. of a pale cream colored product, only 1% of which is hydrolysable by α-amylase and which is insoluble in water.

PREPARATION B

Citrated Starch

Raw maize starch (150 g.) was dispersed in water (1 liter) and anhydrous citric acid (7.5 g.) was added. After efficient agitation, the mixture was heated to boiling and refluxed for 8 hours. A sample was then found to have a dextrose equivalent of 19.4. A further 15 g. of anhydrous citric acid was then added, with efficient agitation, and the product was then evaporated to about 25% solids content, by heating at 40° C. under vacuum, and spray-dried in conventional spray-drying apparatus, using an air inlet temperature of 150°–170° C. and an outlet temperature of about 100° C. The product, which now had a water content of less than 5%, was then heated at 180° C. as in Preparation A, but a period of 6 hours was found to be necessary to reduce the proportion of product hydrolyzable by α-amylase to less than 5%. The product, which contains less than 10% soluble material, was treated as in Preparation A to yield a similar final product.

PREPARATION C

Citrated Starch

The procedure of Preparation B was repeated, except that the period of refluxing of the starch with citric acid was increased to 12 hours, to form a product having a dextrose equivalent of 26.0. A period of only 2 hours was then found to be necessary to reduce the proportion of product hydrolyzable by α-amylase to less than 5%. The product, which contains less than 10% soluble material, was treated as in Preparation A to yield a similar final product.

PREPARATION D

Citrated Starch

The procedure of Preparation B was repeated but using 950 g. raw maize starch and 50 g. citric acid and the period of refluxing was increased to 20 hours to form a product having a dextrose equivalent of 37. Citric acid was added to increase the citric acid content to 15.9% (based on the total solids content) and the solution was then evaporated and spray-dried as described in Preparation B. The residue was heated under vacuum at 180° C. for 2 hours to give a product which was bleached, neutralized, washed and dried as described in Preparation A to yield a similar final product (760 g.).

PREPARATION E

Sugar Replacement

A sugar replacement was prepared using the following ingredients and method:

| Ingredients | Percent by weight |
| --- | --- |
| Bleached and neutralized modified polydextrose | 99.0 |
| Sodium cyclamate | 0.9 |
| Sodium saccharin | 0.1 |
| | 100.0 |

Method: In a laboratory ball mill, the ingredients were blended until a homogeneous mixture was obtained. (10 minutes). The resulting powder exhibited sweetness intensity, bulkiness and physical characteristics similar to sucrose. However, it contains 25% the caloric value of sucrose.

The modified polydextrose was prepared according to the procedure of Example I of U.S. Pat. No. 3,766,165.

What is claimed is:

1. A composition, suitable for use as a flour substitute, which comprises:
   (a) at least one member selected from the group consisting of cellulose and a non-digestible, acid-treated starch derivative,
   (b) xanthan gum, and
   (c) as an emulsifier, lecithin;
   wherein (b) is present in an amount in the range from about 1 to about 3.5 percent by weight, based on the weight of (a) and is in addition to any lecithin supplied to said composition in the form of egg yolk; and (c) is present in an amount from about 2 to about 7 percent by weight, based on the weight of (a).

2. A composition according to claim 1, wherein (a) is cellulose.

3. A composition according to claim 2, wherein the xanthan gum is present in an amount in the range from about 1 to about 2 percent by weight, based on the weight of cellulose; and the lecithin is present in an amount in the range from about 3 to about 5 percent, based on the weight of cellulose.

4. A method of extending flour, which comprises adding thereto an amount of a composition according to claim 1, such that the ratio by weight of flour to the said composition according to claim 1 is in the range from about 9:1 to about 3:7.

5. A baked food product comprising a digestible starch and a flour substitute, the ratio of the digestible starch to the flour substitute being in the range from about 9:1 to about 3:7, and said flour substitute comprising:
   (a) at least one member selected from the group consisting of cellulose and a non-digestible, acid-treated starch derivative,
   (b) xanthan gum, and
   (c) as an emulsifier, lecithin,
   wherein (b) is present in an amount in the range from about 1 to about 3.5 percent by weight, based on the weight of (a); and (c) is present in an amount from about 2 to about 7 percent by weight, based on the weight of (a) and is in addition to any lecithin supplied to said composition in the form of egg yolk.

6. A baked food composition according to claim 5, wherein (a) is cellulose.

7. A baked food product according to claim 6, wherein it is a yeast leavened baked product.

8. A baked food product accoridng to claim 6, wherein it is a chemically leavened baked product.

9. A baked food product according to claim 6, wherein it is an air leavened baked product.

10. A baked food product according to claim 6, wherein said baked food product is selected from the group consisting of bread, cakes, cookies, pastries and doughnuts.

* * * * *